United States Patent
Xu et al.

(10) Patent No.: US 10,469,212 B2
(45) Date of Patent: Nov. 5, 2019

(54) DATA TRANSMISSION METHOD AND DEVICE

(71) Applicant: ZTE Corporation, Shenzhen (CN)

(72) Inventors: Jin Xu, Shenzhen (CN); Jun Xu, Shenzhen (CN); Bo Dai, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 230 days.

(21) Appl. No.: 15/514,112

(22) PCT Filed: May 13, 2015

(86) PCT No.: PCT/CN2015/078886
§ 371 (c)(1),
(2) Date: Mar. 24, 2017

(87) PCT Pub. No.: WO2016/045391
PCT Pub. Date: Mar. 31, 2016

(65) Prior Publication Data
US 2017/0294990 A1 Oct. 12, 2017

(30) Foreign Application Priority Data
Sep. 24, 2014 (CN) .......................... 2014 1 0495661

(51) Int. Cl.
*H04L 1/18* (2006.01)
*H04L 1/00* (2006.01)

(52) U.S. Cl.
CPC .............. *H04L 1/1867* (2013.01); *H04L 1/00* (2013.01); *H04L 1/0065* (2013.01);
(Continued)

(58) Field of Classification Search
CPC ....... H04L 1/1867; H04L 1/00; H04L 1/0065; H04L 1/0071; H04L 1/1812;
(Continued)

(56) References Cited

U.S. PATENT DOCUMENTS

2003/0123409 A1* 7/2003 Kwak et al.
2008/0282125 A1 11/2008 Hafeez et al.
(Continued)

FOREIGN PATENT DOCUMENTS

| CN | 101615986 A | 12/2009 |
| CN | 101667884 A | 3/2010 |

(Continued)

OTHER PUBLICATIONS

International Search Report for corresponding application PCT/CN2015/078886 filed May 13, 2015; dated Aug. 19, 2015.
(Continued)

*Primary Examiner* — Melvin C Marcelo
(74) *Attorney, Agent, or Firm* — Cantor Colburn LLP

(57) ABSTRACT

A data transmission method and device are provided. The method includes: a first transmission node sends data signal (s) for first transmission to a second transmission node, wherein the data signal(s) including data of at least one Transmission Block (TB), the TB including K Code Blocks (CBs), and the K CBs being divided into P CB sets; the first transmission node performs packet coding on M CB sets in the P CB sets to obtain S check CB sets; and the first transmission node generates data signal(s) for retransmission and sends the data signal(s) to the second transmission node, the data signal(s) for retransmission at least including Q bits in the check CB sets when a preset condition is met. The embodiments of the present disclosure may effectively reduce resources for retransmission under the condition of not increasing an amount of feedback information.

20 Claims, 4 Drawing Sheets

(52) U.S. Cl.
CPC .......... *H04L 1/0071* (2013.01); *H04L 1/1812* (2013.01); *H04L 1/1816* (2013.01); *H04L 1/0061* (2013.01); *H04L 1/0064* (2013.01); *H04L 1/0076* (2013.01)

(58) Field of Classification Search
CPC ... H04L 1/1816; H04L 1/0061; H04L 1/0064; H04L 1/0076
See application file for complete search history.

(56) References Cited

U.S. PATENT DOCUMENTS

| | | | |
|---|---|---|---|
| 2009/0077456 | A1* | 3/2009 | Pi et al. |
| 2010/0100787 | A1 | 4/2010 | Zhang |
| 2012/0236910 | A1* | 9/2012 | Mikami |
| 2013/0042073 | A1* | 2/2013 | Tao |
| 2016/0173232 | A1* | 6/2016 | Mallik et al. |

FOREIGN PATENT DOCUMENTS

| | | |
|---|---|---|
| CN | 101964703 A | 2/2011 |
| EP | 2733881 A1 | 5/2014 |

OTHER PUBLICATIONS

"Number of HARQ Channels", 3GPP TSG RAN WG1 Meeting #46bis, Seoul, Korea, Oct. 9-13, 2016, pp. 1-7.
Matthias Woltering, et al. "Performance of HARQ with Reduced Size Retransmissions using Network Coding Principles", 2013 IEEE 77th Vehicular Technology Conference (VTC Spring), Jun. 2, 2013, pp. 1-6, XP032547842.
Supplementary European Search Report dated Aug. 22, 2017, re: Application No. EP 15 84 4915, pp. 1-12, citing: Woltering et al. "Performance of HARQ . . . ", EP 2 733 881 A1 and US 2008/ 0282125 A1.

* cited by examiner

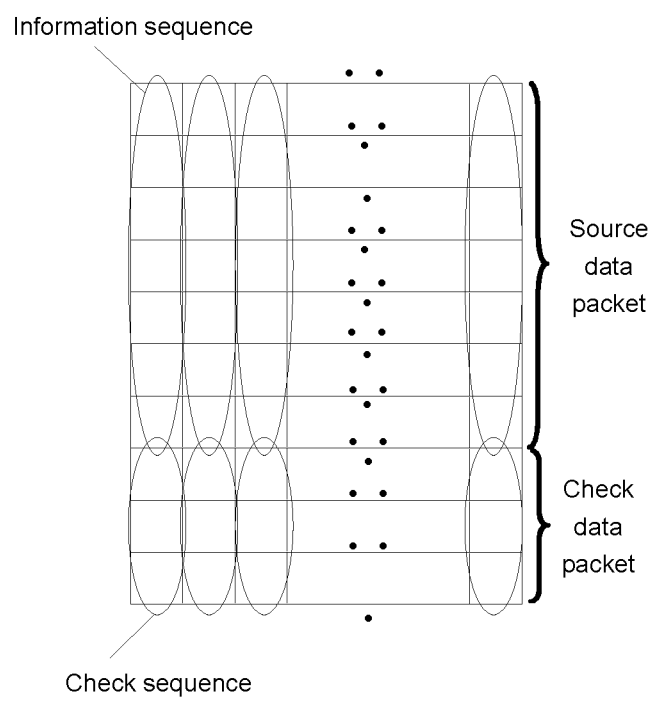

DATA TRANSMISSION METHOD AND DEVICE

TECHNICAL FIELD

The present disclosure relates to the field of mobile communications, and more particularly to a data transmission method and device.

BACKGROUND

In a current Long-Term Evolution (LTE) system, a physical-layer data shared channel performs data transmission by taking Transmission Block (TB) as a basic unit. A receiver judges whether a current TB is correctly received or not through a Cyclic Redundancy Check (CRC) of the TB. If the TB is correctly received, the receiver feeds back an Acknowledgement (ACK) message to a sender. If the TB is not correctly received, the receiver feeds back a Negative Acknowledgement (NACK) message to the sender. The sender retransmits data to the receiver after receiving the NACK message, and retransmission is still performed by taking TB as the unit.

When a size of a TB exceeds a specified threshold, the sender is usually required to perform Code Block (CB) segmentation to segment the TB into multiple CBs, and operations of coding, rate matching, CB concatenation and the like are performed on each CB for sending to the receiver respectively.

A CRC is added to each CB before coding, and in addition, each TB also has a CRC. In LTE, lengths of the two CRCs are both 24 bit. A CB CRC is configured for premature termination of decoding. The CB CRC may also check correctness of a CB. If the CB CRC succeeds in checking, it is indicated that the CB is a correct CB, and if the CB CRC fails in checking, it is indicated that the CB is an incorrect CB.

The TB CRC is configured for correctness checking of a received TB. When the TB CRC fails in checking at the receiver, it is indicated that the TB is incorrectly received, and the TB is required to be retransmission. When a TB includes a relatively larger number of CBs, relatively more resources are occupied by retransmission. For example, as shown in FIG. 1, a TB includes 8 CBs, and only CB2 and CB5 are incorrectly decoded during first transmission. However, during retransmission, the other CBs without errors are also required to be retransmission. This is because an ACK/NACK of the current LTE system is fed back on the basis of a TB, there is no CB-based ACK/NACK feedback and CB-based feedback may cause extremely high uplink ACK/NACK feedback overhead.

Packet coding is a technology for coding between data packets, i.e. a process of coding multiple source data packets to generate check data packets. As shown in FIG. 2, a process of generating a check sequence at a corresponding position in a check data packet from an information sequence at a corresponding position in a source data packet is packet coding. Each check data packet includes data at corresponding positions in one or more check sequences. There may be various packet coding methods. For example, check data packets may be generated in a manner of performing an exclusive OR operation on each source data packet, the check data packets may also be generated in a Reed-Solomon coding manner, and the check data packets may further be generated in a fountain code or network coding manner.

In a digital mobile communication system, a coding bit sequence obtained by rate matching is required to be modulated into digital baseband signal(s) for transmission. In an LTE system, common modulation constellation diagrams include Binary Phase Shift Keying (BPSK), Quadrature Phase Shift Keying (QPSK), 16 Quadrature Amplitude Modulation (16QAM), 64 Quadrature Amplitude Modulation (64QAM) and the like. All of these modulation constellation diagrams include one or more limited discrete constellation points configured to represent amplitudes and phases of digital baseband signals, and geographical distances between the constellation points are called as Euclidean distances. If Euclidean distances between adjacent constellation points are equal and each constellation point is uniformly distributed in a constellation diagram, the modulation constellation diagram is called as a uniform constellation diagram. For example, the modulation constellation diagrams such as QPSK, 16QAM and 64QAM adopted in the LTE system are all uniform constellation diagrams. On the contrary, if Euclidean distances between adjacent constellation points are unequal or each constellation point is non-uniformly distributed in a constellation diagram, the constellation diagram is called as a non-uniform constellation diagram.

In a related technology, data retransmission of a physical layer is based on the whole TB, that is, if at least one CB in TB signal(s) is incorrectly received during first transmission, the whole TB is required to be retransmission during retransmission and CBs which are correctly received during first transmission are still required to be transmitted during retransmission, which is obviously unfavorable for utilization of a spectrum resource during retransmission. For improving retransmission efficiency, an apparent method is that a receiver performs feedback on each CB and then a sender may only be required to retransmit an incorrectly received CB. However, the method has an obvious defect that overhead of feedback signaling is increased, and an ACK or NACK is fed back for each CB, which may increase the amount of feedback signaling by multiple times and even dozens of times to severely exceed a bearing capability of a feedback channel. Therefore, the method is not adopted by a mainstream communication technology such as LTE.

SUMMARY

Embodiments of the present disclosure are intended to solve the technical problem of how to effectively reduce resources for retransmission under the condition of not increasing an amount of feedback information during data transmission.

In one aspect, the embodiments of the present disclosure provide a data transmission method, which may be applied to a first transmission node. The method includes: the first transmission node sends data signal(s) for first transmission to a second transmission node, wherein the data signal(s) may include data of at least one TB, the TB may include K CBs, and the K CBs may be divided into P CB sets, where K and P may be positive integers, $K \geq 3$ and $2 \leq P \leq K$; the first transmission node performs packet coding on M CB sets in the P CB sets to obtain S check CB sets, wherein the lengths of the check CB sets may be T bits, M, S and T may all be positive integers and $2 \leq M \leq P$; and the first transmission node generates data signal(s) for retransmission and sends the data signal(s) to the second transmission node, the data signal(s) for retransmission at least including Q bits in the check CB sets when a preset condition is met, where Q may be a positive integer and $1 \leq Q \leq T$.

In certain embodiments, a number of CBs in each CB set may be determined as follows: when K can be exactly divided by P, each CB set may include K/P CBs; and when K cannot be exactly divided by P, each CB set in $P_1=K-P\cdot\lfloor K/P\rfloor$ CB sets may include $\lceil K/P\rceil$ CBs, and each CB set in $P_2=P\cdot\lceil K/P\rceil-K$ CB sets may include $\lfloor K/P\rfloor$ original CBs and a filling CB, where operators $\lceil x\rceil$ and $\lfloor x\rfloor$ may represent a rounding-up or rounding-down operation over x respectively, and $P_1+P_2=P$.

In certain embodiments, the filling CB may be formed by any preset data, including a CB formed by an all-1 bit sequence or an all-0 bit sequence, or any CB in the CB set, or any CB in the K CBs in the TB.

In certain embodiments, the method may further include CB concatenation is performed on the CBs in each CB set, wherein CB concatenation may refer to that bit sequences of all the CBs in the CB set are connected in series.

In certain embodiments, the K CBs in the CB sets may be CBs subjected to channel coding and rate matching, and the K CBs in the CB sets and the K CBs in the TB may be generated by the same information bit sequences through a channel coder.

In certain embodiments, packet coding of the M CB sets in the P CB sets may refer to that the M CB sets are selected from the P CB sets for packet coding, wherein a selection method may be one of the following methods: M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

In certain embodiments, packet coding may refer to that bits or symbols at the same index positions in the M CB sets are coded to generate the S check CB sets.

In certain embodiments, packet coding may refer to that cyclic shift or interleaving is performed on CBs, bits or symbols of the M CB sets respectively, and then the bits or symbols at the same index positions are coded to generate the S check CB sets.

In certain embodiments, coding may adopt one of the following manners: bit exclusive or coding, linear coding such as Reed-Solomon coding, BCH coding and digital fountain coding, symbol superimposition coding, network coding and the like.

In certain embodiments, when lengths of the M CB sets are different, filling bits may be added into the other CB sets by taking the length of the longest CB set as a reference, the lengths of all the M CB sets being the same after filling, wherein the filling bits may be formed by any preset bit sequences, including all-1 bit sequences or all-0 bit sequences, or part of bits in any CB in the CB sets.

In certain embodiments, the data signal(s) for retransmission at least includes the Q bits in the check CB sets may refer to that: data signal(s) for at least one retransmission in m retransmission data signals include the Q bits in the check CB sets, where m may be a positive integer; and the data signal(s) for at least one retransmission may include the Q bits in the check CB sets according to any one of the following manners: only data signal(s) for the first retransmission includes the Q bits in the check CB sets; or, the first G1 data signal(s) for retransmission include the Q bits in the check CB sets, and the data signal(s) for retransmission from (G1+1)th retransmission do not include any bit in the check CB sets, where G1 may be a fourth preset threshold value, G1 may be a positive integer and $1\le G1\le D$, where D may be a system allowed maximum number of retransmission times; or, the first G2 data signal(s) for retransmission do not include any bit in the check CB sets, and the data signal(s) for retransmission from (G2+1)th retransmission include the Q bits in the check CB sets, where G2 may be a fifth preset threshold value, G2 may be a positive integer and $1\le G2\le D$, where D may be the system allowed maximum number of retransmission times; or, only odd data signal(s) for retransmission include the Q bits in the check CB sets; or, only even data signal(s) for retransmission include the Q bits in the check CB sets.

In certain embodiments, the preset condition may be that the first transmission node or the second transmission node semi-statically or dynamically configures a packet coding retransmission mode.

In another aspect, the embodiments of the present disclosure provide a device, which may be arranged in a transmission node. The device includes: a sending module, which is configured to send data signal(s) for first transmission to a second transmission node, wherein the data signal(s) may include data of at least one TB, the TB may include K CBs, and the K CBs may be divided into P CB sets, where K and P may be positive integers, $K\ge 3$ and $2\le P\le K$; a packet coding module, which is configured to perform packet coding on M CB sets in the P CB sets to obtain S check CB sets, wherein the lengths of the check CB sets may be T bits, M, S and T may all be positive integers and $2\le M\le P$; and a retransmission data generation module, which is configured to generate data signal(s) for retransmission and send it to the second transmission node through the sending module, the data signal(s) for retransmission at least including Q bits in the check CB sets when a preset condition is met, where Q may be a positive integer and $1\le Q\le T$.

In certain embodiments, the device may further include a CB set division module, which is configured to divide the K CBs into the P CB sets, and a number of CBs in each CB set being determined as follows: when K may be exactly divided by P, each CB set may include K/P CBs; and when K may not be exactly divided by P, each CB set in $P_1=K-P\cdot\lfloor K/P\rfloor$ CB sets may include $\lceil K/P\rceil$ CBs, and each CB set in $P_2=P\cdot\lceil K/P\rceil-K$ CB sets may include $\lfloor K/P\rfloor$ original CBs and a filling CB, where operators $\lceil x\rceil$ and $\lfloor x\rfloor$ may represent a rounding-up or rounding-down operation over x respectively, and $P_1+P_2=P$.

In certain embodiments, the filling CB may be formed by any preset data, including a CB formed by an all-1 bit sequence or an all-0 bit sequence, or any CB in the CB set, or any CB in the K CBs in the TB.

In certain embodiments, the device may further include a concatenation module, which is configured to perform CB concatenation on the CBs in each CB set, wherein CB concatenation may refer to that bit sequences of all the CBs in the CB set are connected in series.

In certain embodiments, the K CBs in the CB sets may be CBs subjected to channel coding and rate matching; and the K CBs in the CB sets and the K CBs in the TB may be generated by the same information bit sequences through a channel coder.

In certain embodiments, the operation that the packet coding module performs packet coding on the M CB sets in the P CB sets may refer to that the M CB sets are selected from the P CB sets for packet coding, wherein a selection method may be one of the following methods: M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

In certain embodiments, the operation that the packet coding module performs packet coding may refer to that the packet coding module codes bits or symbols at the same index positions in the M CB sets to generate the S check CB sets.

In certain embodiments, the operation that the packet coding module performs packet coding may refer to that the packet coding module performs cyclic shift or interleaving on CBs, bits or symbols of the M CB sets respectively, and then codes the bits or symbols at the same index positions to generate the S check CB sets.

In certain embodiments, coding of the packet coding module may adopt one of the following manners: bit exclusive or coding, linear coding such as Reed-Solomon coding, BCH coding and digital fountain coding, symbol superimposition coding, network coding and the like.

In certain embodiments, the packet coding module may further be configured to, when lengths of the M CB sets are different, add filling bits into the other CB sets by taking the length of the longest CB set as a reference, the lengths of all the M CB sets being the same after filling, wherein the filling bits may be formed by any preset bit sequences, including all-1 bit sequences or all-0 bit sequences, or part of bits in any CB in the CB sets.

In certain embodiments, that the data signal(s) for retransmission at least includes the Q bits in the check CB sets may refer to that:

data signal(s) for retransmission generated at least one time in data signals for retransmission generated m times by the retransmission data generation module includes the Q bits in the check CB sets, where m may be a positive integer;

the data signal(s) for retransmission generated at least one time may include the Q bits in the check CB sets according to any one of the following manners:

only data signal(s) for retransmission generated in the first time includes the Q bits in the check CB sets;

or, the first G1 generated retransmission data signals include the Q bits in the check CB sets, and the generated data signal(s) for retransmission from (G1+1)th retransmission do not include any bit in the check CB sets, where G1 may be a fourth preset threshold value, G1 may be a positive integer and $1 \leq G1 \leq D$, where D may be a system allowed maximum number of retransmission times;

or, the first G2 generated retransmission data signals do not include any bit in the check CB sets, and the generated retransmission data signals from (G2+1)th retransmission include the Q bits in the check CB sets, where G2 may be a fifth preset threshold value, G2 may be a positive integer and $1 \leq G2 \leq D$, where D may be the system allowed maximum number of retransmission times;

or, only odd generated retransmission data signals include the Q bits in the check CB sets;

or, only even generated retransmission data signals include the Q bits in the check CB sets.

In certain embodiments, the preset condition may be that the first or second transmission node semi-statically or dynamically configures a packet coding retransmission mode.

In the data transmission method and device provided by the embodiments of the present disclosure, a relatively larger TB is divided into multiple CB sets, each CB set consists of multiple CBs, and when retransmission is required, packet coding may be performed between these CB sets, and data obtained by packet coding is sent to a receiver as part of the retransmission data. Packet coding is based on the CB sets, and a length of a redundant data packet generated by packet coding is only ½ and even 1/P of the TB, so that a retransmission data volume may be effectively reduced, data retransmission efficiency may be improved, and meanwhile, an amount of feedback information is not increased.

The embodiments of the present disclosure have the beneficial effect that retransmission performance is enhanced. In the related technology, multiple CBs of a TB are mutually independent, so that performance of the TB is limited to performance of the single CBs, and the same is true during retransmission. The retransmission data of the embodiments of the present disclosure includes the data obtained by packet coding of the CB sets, and packet coding refers to addition of a layer of coding between the CBs, so that the multiple CBs are not mutually independent but mutually associated. If a CB gets incorrect, it may be corrected by virtue of additional information provided by another CB during decoding. Therefore, the retransmission performance is improved.

Therefore, the embodiments of the present disclosure overcome a defect of the related technology, effectively reduce the retransmission data volume under the condition of not increasing the amount of the feedback information, and improve the retransmission performance.

BRIEF DESCRIPTION OF THE DRAWINGS

FIG. 1 is a schematic diagram of a receiving condition of multiple CBs in a TB.

FIG. 2 is a schematic diagram of packet coding.

DETAILED DESCRIPTION OF THE EMBODIMENTS

Figure 3:
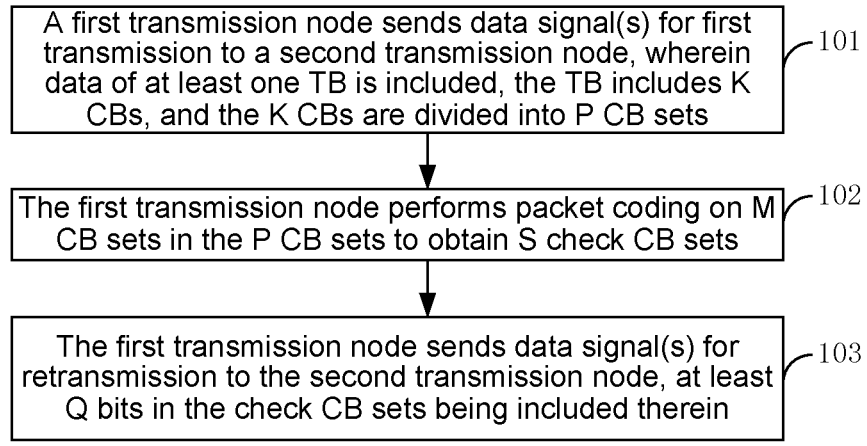
FIG. 3 is a flowchart of a data transmission method according to embodiment one.

The technical solutions of the present disclosure will be described below with reference to the drawings and embodiments in more detail.

A data transmission method is provided, which is applied to a first transmission node, and the method includes:

the first transmission node sends data signal(s) for first transmission to a second transmission node, wherein the data signal(s) includes data of at least one TB, the TB includes K CBs, and the K CBs are divided into P CB sets, where K and P are positive integers, K≥3 and 2≤P≤K;

the first transmission node performs packet coding on M CB sets in the P CB sets to obtain S check CB sets, wherein the lengths of the check CB sets are T bits, M, S and T are all positive integers and 2≤M≤P; and the first transmission node generates data signal(s) for retransmission and sends the data signal(s) to the second transmission node, the data signal(s) for retransmission at least including Q bits in the check CB sets when a preset condition is met, where Q is a positive integer and 1≤Q≤T.

In certain embodiments, the first transmission node may be, but not limited to: any network element with data receiving and signaling sending functions such as an evolved Node B, a relay and a terminal.

In certain embodiments, the second transmission node may be, but not limited to: any network element with a signaling receiving function such as a terminal, an evolved Node B and a relay.

In certain embodiments, a value of P and a solution for dividing the CBs into the CB sets may be determined by the first transmission node, and may also be determined and notified to the first transmission node by the second transmission node.

In certain embodiments, the method further includes that: the first transmission node receives correctness or incorrectness indication information ACK or NACK about the TB from the second transmission node.

In certain embodiments, the method further includes that: if transmission from the first transmission node to the second transmission node is performed in a downlink direction, the first transmission node indicates that current transmission is first transmission or retransmission through downlink control information.

In certain embodiments, before the step that the first transmission node sends the data signal(s) for retransmission to the second transmission node, the method further includes that: if transmission from the first transmission node to the second transmission node is performed in an uplink direction and the first transmission node detects the downlink control information about the TB, the first transmission node determines whether to send the data signal(s) for retransmission to the second transmission node or not according to the downlink control information.

In certain embodiments, before the step that the first transmission node sends the data signal(s) for retransmission to the second transmission node, the method further includes that: if transmission from the first transmission node to the second transmission node is performed in the uplink direction and the first transmission node does not detect the downlink control information about the TB, the first transmission node determines whether to send the data signal(s) for retransmission to the second transmission node or not according to the received correctness or incorrectness indication information ACK or NACK about the TB, wherein the first transmission node does not send the data signal(s) for retransmission to the second transmission node if receiving the correctness indication information ACK, and the first transmission node sends the data signal(s) for retransmission to the second transmission node if receiving the incorrectness indication information NACK.

In certain embodiments, a number of CBs in each CB set may be determined in the following manner: when K can be exactly divided by P, each CB set may include K/P CBs; and when K cannot be exactly divided by P, each CB set in $P_1=K-P\cdot\lfloor K/P \rfloor$ CB sets includes $\lceil K/P \rceil$ CBs, and each CB set in $P_2=P\cdot\lceil K/P \rceil-K$ CB sets includes $\lfloor K/P \rfloor$ original CBs and a filling CB, where operators $\lceil x \rceil$ and $\lfloor x \rfloor$ represent a rounding-up or rounding-down operation over x respectively, and $P_1+P_2=P$.

In certain embodiments, the filling CB may be formed by any preset data, including, but not limited to: a CB formed by an all-1 bit sequence or an all-0 bit sequence, or any CB in the CB set.

In certain embodiments, the filling CB may be formed by any preset data, including, but not limited to: the CB formed by the all-1 bit sequence or the all-0 bit sequence, or any CB in the K CBs in the TB.

In certain embodiments, the method further includes that: CB concatenation is performed on the CBs (including the filling CB) in each CB set, wherein CB concatenation refers to that bit sequences of all the CBs in the CB set are connected in series.

In certain embodiments, the K CBs in the CB sets may be CBs subjected to channel coding and rate matching.

In certain embodiments, the K CBs in the CB sets and the K CBs in the TB are generated by the same information bit sequences (or called as bit sequences to be coded) through a channel coder.

In certain embodiments, packet coding of the M CB sets in the P CB sets refers to that the M CB sets are selected from the P CB sets for packet coding, wherein a selection method may be, but not limited to, one of the following methods:

M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

The first, second and third threshold values may be all or partially the same, and may also be different.

In certain embodiments, packet coding may refer to that bits or symbols at the same index positions in the M CB sets are coded to generate the S check CB sets.

In certain embodiments, packet coding may further refer to that cyclic shift or interleaving is performed on CBs, bits or symbols of the M CB sets respectively, and then the bits or symbols at the same index positions are coded to generate the S check CB sets.

In certain embodiments, coding may adopt, but not limited to, one of the following manners: bit exclusive or coding, linear coding such as Reed-Solomon coding, BCH coding and digital fountain coding, symbol superimposition coding, network coding and the like.

In certain embodiments, a packet coding module is further configured to, when lengths of the M CB sets are different, add filling bits into the other CB sets by taking the length of the longest CB set as a reference, the lengths of all the M CB sets being the same after filling, wherein the filling bits may be formed by, but not limited to, any preset bit sequences, including, but not limited to: all-1 bit sequences or all-0 bit sequences, or part of bits in any CB in the CB sets.

In certain embodiments, that the data signal(s) for retransmission at least includes the Q bits in the check CB sets may refer to that:

data signal(s) for at least one retransmission in m retransmission data signals includes the Q bits in the check CB sets, where m is a positive integer; and the data signal(s) for at least one retransmission may include the Q bits in the check CB sets according to, but not limited to, any one of the following manners:

only data signal(s) for the first retransmission includes the Q bits in the check CB sets;

or, the first G1 retransmission data signals include the Q bits in the check CB sets, and the retransmission data signals from (G1+1)th retransmission do not include any bit in the check CB sets, where G1 is a fourth preset threshold value, G1 is a positive integer and $1 \leq G1 \leq D$, where D is a system allowed maximum number of retransmission times;

or, the first G2 retransmission data signals do not include any bit in the check CB sets, and the retransmission data signals from (G2+1)th retransmission include the Q bits in the check CB sets, where G2 is a fifth preset threshold value, G2 is a positive integer and $1 \leq G2 \leq D$, where D is the system allowed maximum number of retransmission times;

or, only odd retransmission data signals include the Q bits in the check CB sets;

or, only even retransmission data signals include the Q bits in the check CB sets.

The fourth and fifth threshold values may be the same, and may also be different.

In certain embodiments, the preset condition is that the first transmission node or the second transmission node semi-statically or dynamically configures a packet coding retransmission mode.

That is, when the first or second transmission node semi-statically or dynamically configures the packet coding retransmission mode, the data signal(s) for retransmission sent to the second transmission node by the first transmission node includes the Q bits in the check CB sets, or, the data signal(s) for retransmission does not include any bit in the check CB sets.

The embodiments of the present disclosure further provide a device, which is arranged in a transmission node, and the device includes:

a sending module, configured to send data signal(s) for first transmission to a second transmission node, wherein the data signal(s) includes data of at least one TB, the TB includes K CBs, and the K CBs are divided into P CB sets, where K and P are positive integers, $K \geq 3$ and $2 \leq P \leq K$;

a packet coding module, configured to perform packet coding on M CB sets in the P CB sets to obtain S check CB sets, wherein the lengths of the check CB sets are T bits, M, S and T are all positive integers and $2 \leq M \leq P$; and a retransmission data generation module, configured to generate data signal(s) for retransmission and send it to the second transmission node through the sending module, the data signal(s) for retransmission at least including Q bits in the check CB sets when a preset condition is met, where Q is a positive integer and $1 \leq Q \leq T$.

In certain embodiments, the transmission node may be, but not limited to: any network element with data receiving and signaling sending functions such as an evolved Node B, a relay and a terminal.

In certain embodiments, the second transmission node may be, but not limited to: any network element with a signaling receiving function such as a terminal, an evolved Node B and a relay.

In certain embodiments, the device further includes a CB set division module, configured to divide the K CBs into the P CB sets.

In certain embodiments, a number of CBs in each CB set may be determined in the following manner: when K can be exactly divided by P, each CB set may include K/P CBs; and when K cannot be exactly divided by P, each CB set in $P_1 = K - P \cdot \lfloor K/P \rfloor$ CB sets includes $\lceil K/P \rceil$ CBs, and each CB set in $P_2 = P \cdot \lceil K/P \rceil - K$ CB sets includes $\lfloor K/P \rfloor$ original CBs and a filling CB, where operators $\lceil x \rceil$ and $\lfloor x \rfloor$ represent a rounding-up or rounding-down operation over x respectively, and $P_1 + P_2 = P$.

In certain embodiments, the filling CB may be formed by any preset data, including, but not limited to, a CB formed by an all-1 bit sequence or an all-0 bit sequence, or any CB in the CB set.

In certain embodiments, the filling CB may be formed by any preset data, including, but not limited to, a CB formed by an all-1 bit sequence or an all-0 bit sequence, or any CB in the K CBs in the TB.

In certain embodiments, the device may further include a concatenation module, which is configured to perform CB concatenation on the CBs (including the filling CB) in each CB set, wherein CB concatenation refers to that bit sequences of all the CBs in the CB set are connected in series.

In certain embodiments, the K CBs in the CB sets may be CBs subjected to channel coding and rate matching.

In certain embodiments, the K CBs in the CB sets and the K CBs in the TB are generated by the same information bit sequences (or called as bit sequences to be coded) through a channel coder.

In certain embodiments, the operation that the packet coding module performs packet coding on the M CB sets in the P CB sets refers to that the M CB sets are selected from the P CB sets for packet coding, wherein a selection method may be, but not limited to, one of the following methods:

M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

The first, second and third threshold values may be all or partially the same, and may also be different.

In certain embodiments, the operation that the packet coding module performs packet coding refers to that the packet coding module codes bits or symbols at the same index positions in the M CB sets to generate the S check CB sets.

In certain embodiments, the operation that the packet coding module performs packet coding may further refer to that the packet coding module performs cyclic shift or interleaving on CBs, bits or symbols of the M CB sets respectively, and then codes the bits or symbols at the same index positions to generate the S check CB sets.

In certain embodiments, coding of the packet coding module may adopt, but not limited to, one of the following manners: bit exclusive or (or called as modular two addition) coding, linear coding such as Reed-Solomon coding, BCH coding and digital fountain coding, symbol superimposition coding, network coding and the like.

In certain embodiments, if lengths of the M CB sets are different, filling bits are added into the other CB sets by taking the length of the longest CB set as a reference, the lengths of all the M CB sets being the same after filling, wherein the filling bits may be formed by, but not limited to, any preset bit sequences, including all-1 bit sequences or all-0 bit sequences, or part of bits in any CB in the CB sets.

In certain embodiments, that the data signal(s) for retransmission at least includes the Q bits in the check CB sets may refer to that:

data signal(s) for retransmission generated at least one time in m retransmission data signals generated by the retransmission data generation module includes the Q bits in the check CB sets, where m is a positive integer, and the data signal(s) for retransmission generated at least one time may include the Q bits in the check CB sets according to, but not limited to, any one of the following manners:

only data signal(s) for retransmission generated in the first time includes the Q bits in the check CB sets;

or, the first G1 generated retransmission data signals include the Q bits in the check CB sets, and the generated retransmission data signals from (G1+1)th retransmission do not include any bit in the check CB sets, where G1 is a fourth preset threshold value, G1 is a positive integer and $1 \leq G1 \leq D$, where D is a system allowed maximum number of retransmission times;

or, the first G2 generated retransmission data signals do not include any bit in the check CB sets, and the generated retransmission data signals from (G2+1)th retransmission include the Q bits in the check CB sets, where G2 is a fifth preset threshold value, G2 is a positive integer and $1 \leq G2 \leq D$, where D is the system allowed maximum number of retransmission times;

or, only odd generated retransmission data signals include the Q bits in the check CB sets;

or, only even generated retransmission data signals include the Q bits in the check CB sets.

The fourth and fifth threshold values may be the same, and may also be different.

In certain embodiments, the preset condition is that the first transmission node or the second transmission node semi-statically or dynamically configures a packet coding retransmission mode. That is, when the first or second transmission node semi-statically or dynamically configures the packet coding retransmission mode, the data signal(s) for retransmission sent to the second transmission node by the first transmission node includes the Q bits in the check CB sets, or, the data signal(s) for retransmission does not include any bit in the check CB sets.

The present disclosure will be further described below with reference to the embodiments in detail.

Embodiment One (Embodiment for Retransmission Method)

The embodiment provides a data transmission method, which is applied to a first transmission node. As shown in FIG. 3, the method includes the following steps 101-103.

At Step 101: the first transmission node sends data signal(s) for first transmission to a second transmission node, wherein the data signal(s) include data of at least one TB, the TB includes K CBs, and the K CBs are divided into P CB sets, where K and P are positive integers, $K \geq 3$ and $2 \leq P \leq K$.

At Step 102: the first transmission node performs packet coding on M CB sets in the P CB sets to obtain S check CB sets, wherein the lengths of the check CB sets are T bits, M, S and T are all positive integers and $2 \leq M \leq P$.

At Step 103: the first transmission node sends data signal(s) for retransmission to the second transmission node, at least Q bits in the check CB sets being included therein, where Q is a positive integer and $1 \leq Q \leq T$.

The first transmission node is an evolved Node B or a relay, and the second transmission node is a terminal; or, the first transmission node is a terminal, and the second transmission node is an evolved Node B or a relay.

The number of CBs in each CB set may be determined in the following manner: when K can be exactly divided by P, each CB set may include K/P CBs; and when K cannot be exactly divided by P, each CB set in $P_1 = K - P \cdot \lfloor K/P \rfloor$ CB sets includes $\lceil K/P \rceil$ CBs, and each CB set in $P_2 = P \cdot \lceil K/P \rceil - K$ CB sets includes $\lfloor K/P \rfloor$ original CBs and a filling CB, where operators $\lceil x \rceil$ and $\lfloor x \rfloor$ represent a rounding-up or rounding-down operation over x respectively, and $P_1 + P_2 = P$.

Here, the filling CB may be formed by any preset bit sequence, which includes, but not limited to one of the following manners, the first manner: a CB formed by an all-1 bit sequence or an all-0 bit sequence; and the second manner: any CB in the K original CBs.

The method further includes that CB concatenation is performed on the CBs (including the filling CB) divided into each CB set, wherein CB concatenation refers to that bit sequences of all the CBs in the CB set are connected in series.

In the embodiment of the present disclosure, it is set that each CB set includes t CBs, wherein a length of a bit sequence of an ith CB is $N_i$ bits, and the bit sequence of the ith CB may be recorded as $\{b_i^1, b_i^2, \ldots, b_i^{N_i}\}$, where $b_i^{N_i}$ represents the $N_i$th bit of the ith CB in the CXB set. After CB concatenation, the CB set may be recorded as:

$$\{b_1^1, b_1^2, \ldots, b_1^{N_1} \ldots b_i^1, b_i^2, \ldots, b_i^{N_i} \ldots, b_t^1, b_t^2, \ldots, b_t^{N_t}\}.$$

After being re-indexed, the bit sequence of the first CB set after CB concatenation may be recorded as $\{c_1^1, c_1^2, \ldots, c_1^{N'}\}$, where $c_1^{N'}$ represents the N'th bit in the first CB set, i, t, $N_i$ and N' are all positive integers, $1 \leq i \leq t$, and $$N' = \sum_{i=1}^{t} N_i.$$

Figure 4:
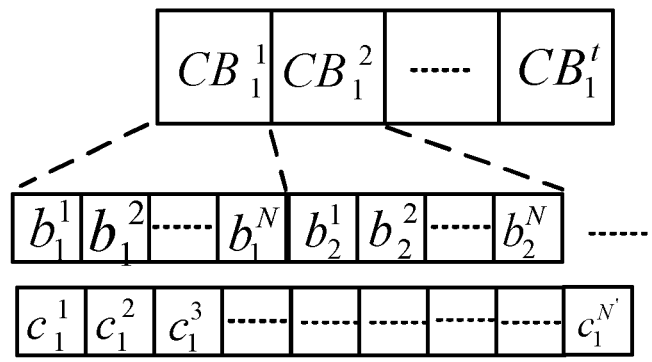
FIG. 4 is a schematic diagram of CB set in embodiments one and two.

For example, the first CB set may be represented as a form shown in FIG. 4, where $CB_1^t$ represents the tth CB in the first CB set.

In certain embodiments, the K CBs (non-filling CBs) in the CB sets may be CBs subjected to channel coding and rate matching.

In certain embodiments, the K CBs in the CB sets and the K CBs in the TB are generated by the same information bit sequences (or called as bit sequences to be coded) through a channel coder.

In certain embodiments, in a communication system which may apply the embodiment, the first transmission node sends the TB to the second transmission node after performing channel coding and rate matching, a method being as follows.

When a size of the TB exceeds a specified threshold, the first transmission node divides the TB into the K CBs, and channel coding is performed on an information bit sequence (or called as a bit sequence to be coded) of each CB, wherein a coding manner of Turbo code, or Low Density Parity Check (LDPC) and the like may be adopted for channel coding.

A fixed code rate $R_0$ is adopted as a master code rate for channel coding, channel coding is performed on each CB by virtue of the code rate $R_0$, and a generated coded code word bit sequence is placed in a cache as a master code. If an information bit length of the ith CB is $L_i$ bits, a length of the master code is $N_0=L_i/R_0$ bits. During a practical application, the cache may be a virtual cache, and a virtual interleaving and rate matching function is realized by an addressing operation.

When the first transmission node sends data to the second transmission node, the first transmission node is required to determine a practical transmission code rate according to a channel condition. If a current transmission code rate is $R_1$, a length of a bit sequence to be sent of the ith CB is $N_1=L_i/R_1$ bits. The rate matching function refers to that $N_1$ bits to be sent are selected from the master code with the length $N_0$. The first transmission node concatenates bit sequences to be sent of the K CBs to form the TB practically sent to the second transmission node.

When the second transmission node does not correctly receive the TB sent by the first transmission node, the second transmission node feeds back incorrectness indication information (NACK) to the first transmission node. The first transmission node sends data signal(s) for retransmission to the second transmission node after receiving the incorrectness indication information NACK. For the ith CB, if a transmission code rate during retransmission is $R_2$, a length of a bit sequence during retransmission is $N_2=L_i/R_2$. During retransmission, the rate matching function refers to that $N_2$ bits are selected from the master code with the length of $N_0$ bits.

It is important to note that: since N1 and N2 may be equal or unequal and a manner for selecting the bit sequences from the master codes (for example, selecting starting positions of the bit sequences to be sent) may be the same or different, the bit sequence to be sent of the same CB may be the same and may also be different during any twice transmission.

In the embodiment, the sent bit sequences of the K CBs forming the TB and the bit sequences of the K CBs divided into the P CB sets belong to first transmission and retransmission respectively, so that the two groups of bit sequences may be the same and may also be different. However, they are generated by the same information bit sequences through the same master code coder, so that they substantially are the same CBs. In the embodiment, CBs with the same information bit sequences are all considered as the same CBs no matter whether they are subjected to channel coding and rate matching or not.

In certain embodiments, packet coding refers to that bits or symbols at the same index positions in the M CB sets are coded to generate the S check CB sets.

In certain embodiments, packet coding may further refer to that cyclic shift or interleaving is performed on CBs, bits or symbols of the M CB sets respectively, and then the bits or symbols at the same index positions are coded to generate the S check CB sets.

In certain embodiments, a coding operation may be, but not limited to, one of the following manners: bit exclusive or (or called as modular two addition) coding, linear coding such as matrix generating coding, Reed-Solomon coding, BCH coding and digital fountain coding, symbol superimposition coding, network coding and the like.

In certain embodiments, in the communication system which may apply the embodiment, digital baseband modulation is required to be performed on the bit sequences to be sent of the first transmission node to generate modulated symbols for sending to the second transmission node, so that packet coding of the embodiment may be bit-level packet coding or symbol-level packet coding.

For example, the first transmission node selects the M CB sets from the P CB sets for packet coding, where M is a positive integer, and $2 \le M \le P$.

The method for selecting the M CB sets from the P CB sets may be, but not limited to, one of the following methods:

M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

In certain embodiments, when lengths of the M CB sets are different, filling bits are added into the other CB sets by taking the length of the longest CB set as a reference, the lengths of all the M CB sets being the same after filling, wherein the filling bits may be formed by, but not limited to, any preset bit sequences, including, but not limited to: all-1 bit sequences or all-0 bit sequences, or part of bits in any CB in the CB sets.

Bit-level packet coding refers to that a bit at each same index position of each CB set in the M CB sets is coded to obtain a bit at a corresponding index position of each check CB set in the S check CB set. For example, an ith bit of each CB set in the M CB sets is coded to obtain an ith bit of each check CB set in the S check CB sets.

Bit-level packet coding may adopt a bit exclusive or (or called modular two addition) coding manner, that is, an exclusive or (or called as modular two addition) operation is performed between bits at the same index positions in multiple CB sets to generate check CB sets. Bit-level packet coding may also adopt a linear coding method such as matrix generation coding, Reed-Solomon coding, BCH coding and digital fountain coding, that is, the bits at the same index positions in the multiple CB sets are determined as information bit sequences, the information bit sequences are coded to generate check bit sequences in the abovementioned manner, and bits with the same position indexes in the multiple check bit sequences are concatenated to form the check CB sets. Bit-level coding may further adopt a network coding manner, that is, linear or nonlinear network coding is performed on the bits at the same index positions in the multiple CB sets to generate coded bit sequences, and the bits with the same position indexes in the multiple coded bit sequences are concatenated to form the check CB sets.

Symbol-level packet coding refers to that digital baseband modulation may be performed on a bit sequence of each CB set in the multiple CB sets to obtain a corresponding modulated symbol sequence, and the modulated symbols at multiple same index positions of the M CB sets are coded to obtain symbols at corresponding index positions of multiple check CB sets in the S check CB sets. For example, an ith modulated symbol of each CB set in the M CB sets is coded to obtain an ith symbol of each check CB set in the S check CB sets.

Symbol-level packet coding may adopt a symbol superimposition coding manner, that is, symbols at the same index positions in multiple CB sets are linearly superimposed to generate check symbol sequences, and the symbols at the same index positions in the check symbol sequences are concatenated to form the check CB sets. Symbol-level coding may also adopt the network coding manner, that is, the linear or nonlinear network coding is performed on the symbols at the same index positions in the multiple CB sets to generate check symbol sequences, and the symbols with the same position indexes in the multiple check symbol sequences are concatenated to form the check CB sets.

If the first transmission node sends m retransmission data signals to the second transmission node, the data signal(s) for at least one retransmission in the data signal(s) for m retransmission includes the Q bits in the check CB sets, where m is a positive integer. A manner may be, but not limited to, any one of the following manners:

only data signal(s) for the first retransmission includes the Q bits in the check CB sets;

or, the first G1 retransmission data signals include the Q bits in the check CB sets, and the retransmission data signals from (G1+1)th retransmission do not include any bit in the check CB sets, where G1 is a fourth preset threshold value, G1 is a positive integer and $1 \leq G1 \leq D$, where D is a system allowed maximum number of retransmission times;

or, the first G2 retransmission data signals do not include any bit in the check CB sets, and the data signal(s) for retransmission from (G2+1)th retransmission include the Q bits in the check CB sets, where G2 is a fifth preset threshold value, G2 is a positive integer and $1 \leq G2 \leq D$, where D is the system allowed maximum number of retransmission times;

or, only odd retransmission data signals include the Q bits in the check CB sets;

or, only even retransmission data signals include the Q bits in the check CB sets;

or, if the first or second transmission node semi-statically or dynamically configures a packet coding retransmission mode, the data signal(s) for retransmission sent to the second transmission node by the first transmission node includes the Q bits in the check CB sets, or, the data signal(s) for retransmission does not include any bit in the check CB sets.

In certain embodiments, formation of the data signal(s) for retransmission includes, but not limited to, the following manners:

a first manner: the data signal(s) for retransmission only include the Q bits in the S check CB sets; and a second manner: the data signal(s) for retransmission not only include the Q bits in the S check CB sets, but also include D bits in the P CB sets, where D is a positive integer, $1 \leq D \leq Z$, where Z is a length of the P CB sets.

Example One

Figure 5:
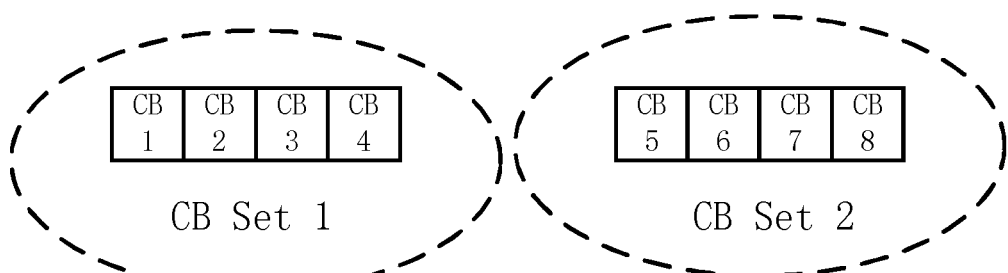
FIG. 5 is a schematic diagram of two CB sets in an example of embodiments one and two.

At Step A1: an evolved Node B (or a relay) sends a TB including 8 CBs to a terminal, wherein each CB has a CB CRC, and each TB also has a TB CRC. The TB is formed by K=8 CBs and P=2 CB sets, i.e. a CB set 1 and a CB set 2. As shown in FIG. 5, because K may be exactly divided by P, each CB set includes K'P=4 CBs, that is, the CB set 1 includes CB1, CB2, CB3 and CB4, and the CB set 2 includes CB5, CB6, CB7 and CB8.

At Step A2: if the TB CRC or the CB CRCs fail in CRC on a terminal side, that is, the terminal does not correctly receive the TB due to influence of a channel error, the terminal feeds back incorrectness indication information (NACK) about the TB to the evolved Node B (or the relay).

The evolved Node B performs packet coding on the two CB sets. At this moment, M=P=2, it is supposed that lengths of bit sequences of both the CB set 1 and the CB set 2 are N' bits, packet coding adopts a bit exclusive or (or called as modular two addition) coding manner, that is, an exclusive or (or called as modular two addition) operation is performed between bits at the same index positions in multiple CB sets.

Figure 6:
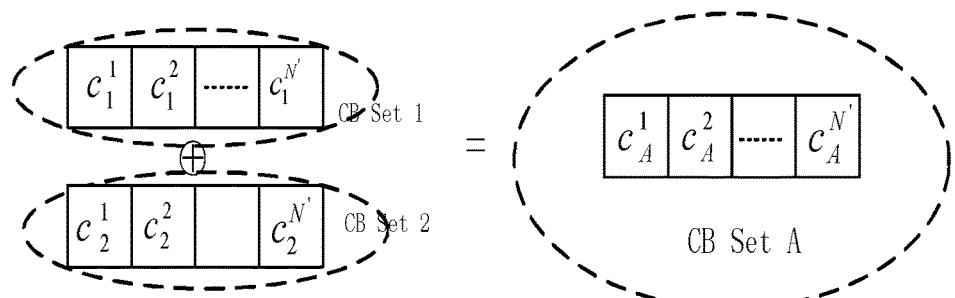
FIG. 6 is a schematic diagram of packet coding between CB sets in an example of embodiments one and two.

As shown in FIG. 6, the exclusive or (or called as modular two additions) operation is performed between the bits at the same index positions in the CB set 1 and the CB set 2:

$$c_1^1 \oplus c_1^1 = c_A^1, c_1^2 \oplus c_1^2 = c_A^2, \ldots, c_1^{N'} \oplus c_1^{N'} = c_A^{N'}$$

The generated check bits are concatenated to form data $\{c_A^1, c_A^2, \ldots, c_A^{N'}\}$ obtained by packet coding. The data obtained by packet coding also forms a CB set, and a length thereof is N' bits.

Figure 7:
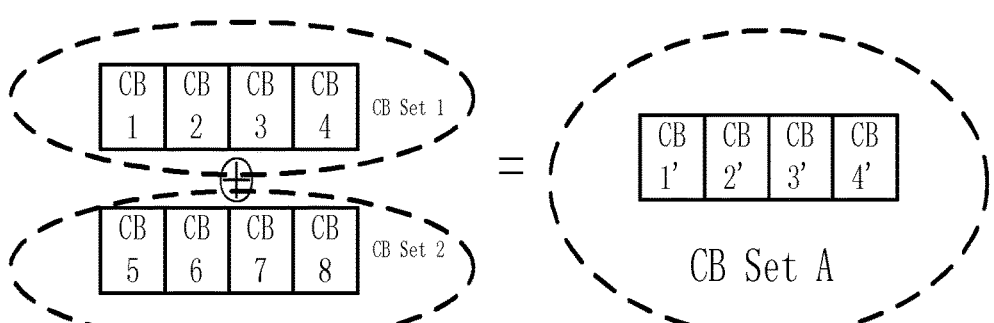
FIG. 7 is a schematic diagram of packet coding between CBs in an example of embodiments one and two.

Each CB set is formed by multiple CBs, so that packet coding between the CB sets may also be considered as packet coding between the CBs. Therefore, packet coding shown in FIG. 6 may also be represented as a form shown in FIG. 7, wherein CB1', CB2', CB3' and CB4' are CBs in a check CB set A obtained by packet coding.

At Step A3: the evolved Node B (or the relay) sends data signal(s) for retransmission to the terminal, wherein a packet coding retransmission mode is semi-statically configured in high-layer signaling of the evolved Node B, and at this moment, the data signal(s) for retransmission may at least include part of bits of $\{c_A^1, c_A^2, \ldots, c_A^{N'}\}$ according to one of the following manners:

the data signal(s) for retransmission only includes all or part of bits of $\{c_A^1, c_A^2, \ldots, c_A^{N'}\}$, or, the data signal(s) for retransmission further includes part or all bits in the CB set 1 or the CB set 2, besides all or part of the bits in $\{c_A^1, c_A^2, \ldots, c_A^{N'}\}$.

After receiving the data signal(s) for retransmission sent by the evolved Node B (or the relay), the terminal decodes the TB by virtue of retransmission data and data received during first transmission, and a decoding method may be, but not limited to, one of the following manners:

hard decision decoding: after hard decision is performed on the data during first transmission and the retransmission data, CBs which are incorrectly decoded during first transmission are recovered by virtue of a characteristic of a linear code; or, soft decision decoding: soft decision information during first transmission and retransmission soft decision information are combined or iteratively decoded to recover the CBs which are incorrectly decoded during first transmission.

Example Two

At Step B1: a terminal sends a TB including 39 CBs to an evolved Node B (or a relay), wherein each CB has a CB CRC, and each TB also has a TB CRC.

At Step B2: if the TB CRC or the CB CRCs fail in CRC on an evolved Node B (or relay) side, that is, the evolved Node B (or the relay) does not correctly receive the TB due to influence of a channel error, the evolved Node B (or the relay) feeds back incorrectness indication information (NACK) about the TB to the terminal.

Figure 8:
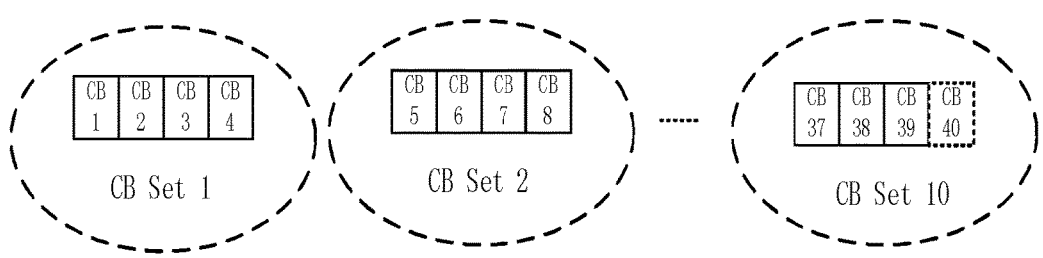
FIG. 8 is a schematic diagram of multiple CB sets in an example of embodiments one and two.

The terminal divides the K=39 CBs of the TB into P=10 CB sets: CB set 1, CB set 2, ..., CB set 10. Because K may not be exactly divided by P, each CB set in $P_1 = K - P \cdot \lfloor K/P \rfloor$ CB sets includes $\lceil K/P \rceil$ CBs, and each CB set in $P_2 = P \cdot \lceil K/P \rceil - K$ CB sets includes $\lfloor K/P \rfloor$ original CBs and a filling CB. That is, each CB set from the CB set 1 to the CB set 9 includes 4 original CBs; the CB set 10 includes 3 original CBs and a filling CB, as shown in FIG. 8. That is, the CB set 1 includes CB1, CB2, CB3 and CB4, the CB set 2 includes CB5, CB6, CB7, CB8, ...; and the CB set 10 includes CB37, CB38, CB39 and CB40.

The CB40 represents the filling CB, and the filling CB40 may be formed by any preset bit sequence, including, but not limited to, one of the following manners:

a first manner: a CB formed by an all-1 bit sequence or an all-0 bit sequence; and a second manner: any CB in the K original CBs of the TB.

Figure 9:
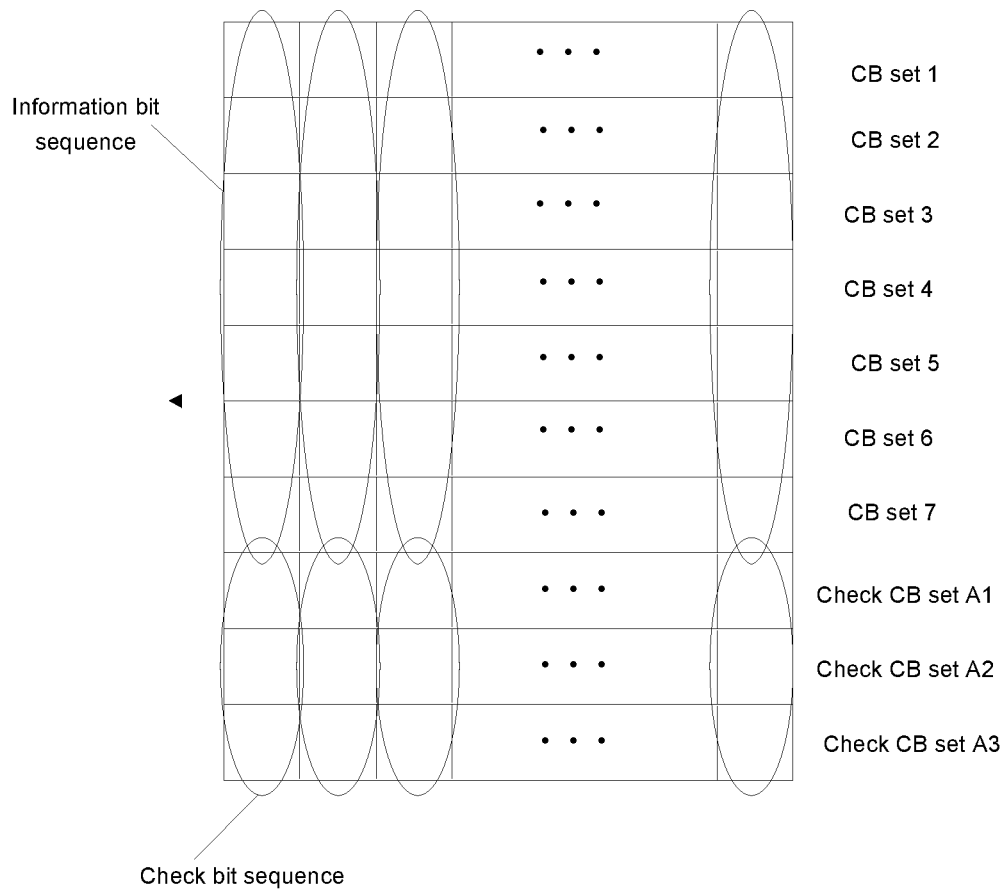
FIG. 9 is a schematic diagram of packet coding in example two of embodiments one and two.

The terminal performs packet coding on 7 CB sets in the 10 CB sets. At this moment, M=7.7 continuous CBs are selected for packet coding. It is supposed that packet coding is performed from the CB set 1 to the CB set 7, packet coding adopts a bit-level coding manner, and as shown in FIG. 9, S=3 check CB sequences are generated, i.e. a check CB set A1, a check CB set A2 and a check CB set A3 respectively.

Part of bits in the check CB sets may be included according to one of the following manners:

data signal(s) for retransmission only includes all or part of bits in the check CB set A1, the check CB set A2 or the check CB set A3; or, the data signal(s) for retransmission further includes part or all bits in the CB set 1 to the CB set 7, besides all or part of the bits in the check CB sets.

After receiving the data signal(s) for retransmission sent by the evolved Node B (or the relay), the terminal decodes the TB by virtue of retransmission data and data received during first transmission, and a decoding method may be, but not limited to, one of the following manners:

hard decision decoding: after hard decision is performed on the data during first transmission and the retransmission data, CBs which are incorrectly decoded during first transmission are recovered by virtue of a characteristic of a linear code; or, soft decision decoding: soft decision information during first transmission and retransmission soft decision information are combined or iteratively decoded to recover the CBs which are incorrectly decoded during first transmission.

Example 3

Step C1 of the example is the same as Step B1 of example two.

A different between Step C2 of the example and Step B2 of example two is that packet coding of the example adopts a symbol-level coding manner.

A different between Step C3 of the example 3 and Step B3 of example two is that data signal(s) for retransmission of the example 3 is represented in form of modulated symbol, and its corresponding retransmission bit sequence before modulation is the same as that of example two.

After receiving the data signal(s) for retransmission sent by an evolved Node B (or a relay), a terminal decodes a TB by virtue of retransmission data and data received during first transmission, and a decoding method may be, but not limited to, one of the following manners:

serial interference elimination decoding: estimation information of M CB sets is obtained after serial interference elimination of retransmission superimposed symbols, and hard decision or soft decision decoding is performed to recover CBs which are incorrectly decoded during first transmission by virtue of the data during first transmission; and maximum likelihood decoding: the estimation information of the M CB sets is obtained by maximum likelihood estimation of the retransmission superimposed symbols, and hard decision or soft decision decoding is performed to recover the CBs which are incorrectly decoded during first transmission by virtue of the data during first transmission.

Embodiment Two (Device Embodiment)

Figure 10:
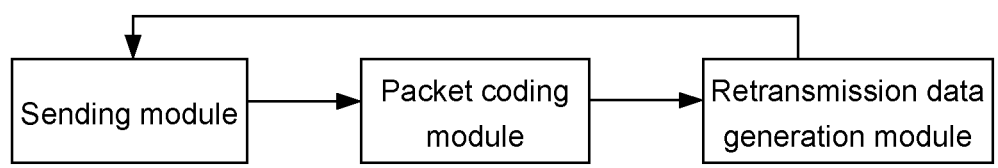
FIG. 10 is a block diagram of a device according to embodiment two.

The embodiment provides a device, which is applied to a first transmission node, and as shown in FIG. 10, the device includes:

a sending module, configured to send data signal(s) for first transmission to a second transmission node, wherein the data signal(s) include data of at least one TB, the TB includes K CBs, and the K CBs are divided into P CB sets, where K and P are positive integers, K≥3 and 2≤P≤K;

a packet coding module, configured to perform packet coding on M CB sets in the P CB sets to obtain S check CB sets, wherein the lengths of the check CB sets are T bits, M, S and T are all positive integers and 2≤M≤P; and a retransmission data generation module, configured to generate data signal(s) for retransmission and send it to the second transmission node through the sending module, the data signal(s) for retransmission at least including Q bits in the check CB sets, where Q is a positive integer and 1≤Q≤T.

Here, the first transmission node is an evolved Node B or a relay, and the second transmission node is a terminal; or, the first transmission node is a terminal, and the second transmission node is an evolved Node B or a relay.

In certain embodiments, the device further includes a CB set division module, configured to divide the K CBs into P CB sets, and the number of CBs in each CB set may be determined in the following manner: when K can be exactly divided by P, each CB set includes K/P CBs; and when K cannot be exactly divided by P, each CB set in $P_1=K-P\cdot\lfloor K/P \rfloor$ CB sets includes $\lceil K/P \rceil$ CBs, and each CB set in $P_2=P\cdot\lceil K/P \rceil\_K$ CB sets includes $\lfloor K/P \rfloor$ original CBs and a filling CB, where operators $\lceil x \rceil$ and $\lfloor x \rfloor$ represent a rounding-up or rounding-down operation over x respectively, and $P_1+P_2=P$.

Here, the filling CB may be formed by any preset bit sequence, including, but not limited to one of the following manners:

a first manner: a CB formed by an all-1 bit sequence or an all-0 bit sequence; and a second manner: any CB in the K original CBs.

The device further includes: a concatenation module, configured to perform CB concatenation on the CBs (including the filling CB) divided into each CB set, wherein CB concatenation refers to that bit sequences of all the CBs in the CB set are connected in series.

In the embodiment of the present disclosure, it is set that each CB set includes t CBs, wherein a length of a bit sequence of an ith CB is $N_i$ bits, and the bit sequence of the ith CB may be recorded as $\{b_i^1, b_i^2, \ldots, b_i^{N_i}\}$, where $b_i^{N_i}$ represents the Nth bit of the ith CB in the CXB set. After CB concatenation, the CB set may be recorded as:

$$\{b_1^1, b_1^2, \ldots, b_1^{N_1} \ldots b_i^1, b_i^2, \ldots, b_i^{N_i} \ldots, b_t^1, b_t^2, \ldots, b_t^{N_t}\}.$$

After being re-indexed, the bit sequence of the first CB set after CB concatenation may be recorded as $\{c_1^1, c_1^2, \ldots, c_1^{N'}\}$, where $c_i^{N'}$ represents the N'th bit in the first CB set, i, t, $N_i$ and N' are all positive integers, 1≤i≤t, and $$N' = \sum_{i=1}^{t} N_i.$$

For example, the CB set 1 may be represented as a form shown in FIG. 4, where $CB_1^t$ represents the tth CB in the first CB set.

In certain embodiments, the K CBs (non-filling CBs) in the CB sets may be CBs subjected to channel coding and rate matching.

The K CBs in the CB sets and the K CBs in the TB are generated by the same information bit sequences through channel coding.

In certain embodiments, in a communication system which may apply the embodiment, the first transmission node sends the TB to the second transmission node after performing channel coding and rate matching, a method being as follows.

When a size of the TB exceeds a specified threshold, the first transmission node divides the TB into the K CBs, and channel coding is performed on an information bit sequence (or called as a bit sequence to be coded) of each CB, wherein a coding manner of Turbo code, or Low Density Parity Check (LDPC) and the like may be adopted for channel coding.

A fixed code rate $R_0$ is adopted as a master code rate for channel coding, channel coding is performed on each CB by virtue of the code rate $R_0$, and a generated coded code word bit sequence is placed in a cache as a master code. If an information bit length of the ith CB is $L_i$ bits, a length of the master code is $N_0=L_i/R_0$ bits. During a practical application, the cache may be a virtual cache, and a virtual interleaving and rate matching function is realized by an addressing operation.

When the first transmission node sends data to the second transmission node, the first transmission node is required to determine a practical transmission code rate according to a channel condition. If a current transmission code rate is $R_1$, a length of a bit sequence to be sent of the ith CB is $N_1=L_i/R_1$ bits. The rate matching function refers to that $N_1$ bits to be sent are selected from the master code with the length $N_0$. The first transmission node concatenates bit sequences to be sent of the K CBs to form the TB practically sent to the second transmission node.

When the second transmission node does not correctly receive the TB sent by the first transmission node, the second transmission node feeds back incorrectness indication information (NACK) to the first transmission node. The first transmission node sends data signal(s) for retransmission to the second transmission node after receiving the incorrectness indication information NACK. For the ith CB, if a transmission code rate during retransmission is $R_2$, a length of a bit sequence during retransmission is $N_2=L_i/R_2$. During retransmission, the rate matching function refers to that $N_2$ bits are selected from the master code with the length of $N_0$ bits.

It is important to note that since N1 and N2 may be equal or unequal and a manner for selecting the bit sequences from the master codes (for example, selecting starting positions of the bit sequences to be sent) may be the same or different, the bit sequence to be sent of the same CB may be the same and may also be different during any twice transmission.

In the embodiment, the sent bit sequences of the K CBs forming the TB and the bit sequences of the K CBs divided into the P CB sets belong to first transmission and retransmission respectively, so that the two groups of bit sequences may be the same and may also be different. However, they are generated by the same information bit sequences through the same master code coder, so that they substantially are the same CBs. In the embodiment, CBs with the same information bit sequences are all considered as the same CBs no matter whether they are subjected to channel coding and rate matching or not.

In certain embodiments, packet coding refers to that bits or symbols at the same index positions in the M CB sets are coded to generate the S check CB sets.

In certain embodiments, packet coding may further refer to that cyclic shift or interleaving is performed on CBs, bits or symbols of the M CB sets respectively, and then the bits or symbols at the same index positions are coded to generate the S check CB sets.

In certain embodiments, a coding operation may be, but not limited to, one of the following manners: bit exclusive or (or called as modular two addition) coding, linear coding such as Reed-Solomon coding, BCH coding and digital fountain coding, symbol superimposition coding, network coding and the like.

In certain embodiments, in the communication system which may apply the embodiment, digital baseband modulation is required to be performed on the bit sequences to be sent of the first transmission node to generate modulated symbols for sending to the second transmission node, so that packet coding of the embodiment may be bit-level packet coding or symbol-level packet coding.

For example, the packet coding module selects the M CB sets from the P CB sets for packet coding, where M is a positive integer, and 2≤M≤P.

The method for selecting the M CB sets from the P CB sets may be, but not limited to, one of the following methods: M continuous CB sets are selected from the P CB sets; or, M equally spaced CB sets are selected from the P CB sets; or, the M CB sets are randomly selected from the P CB sets; or, M CB sets including incorrect CBs of which numbers are not smaller than a first preset threshold value are selected from the P CB sets; or, M CB sets including incorrect CBs of which numbers are not more than a second preset threshold value are selected from the P CB sets; or, M CB sets including incorrect CBs, of which numbers do not exceed a third preset threshold value, at the same index positions are selected from the P CB sets.

If lengths of the M CB sets are different, the packet coding module adds filling bits into the other CB sets by taking the length of the longest CB set as a reference, the lengths of all the M CB sets being the same after filling, wherein the filling bits may be formed by, but not limited to, any preset bit sequences, including, but not limited to: all-1 bit sequences or all-0 bit sequences, or part of bits in any CB in the CB sets.

Bit-level packet coding refers to that a bit at each same index position of each CB set in the M CB sets is coded to obtain a bit at a corresponding index position of each check CB set in the S check CB set. For example, an ith bit of each CB set in the M CB sets is coded to obtain an ith bit of each check CB set in the S check CB sets.

Bit-level packet coding may adopt a bit exclusive or (or called modular two addition) coding manner, that is, an exclusive or (or called as modular two addition) operation is performed between bits at the same index positions in multiple CB sets to generate check CB sets. Bit-level packet coding may also adopt a linear coding method such as matrix generation coding, Reed-Solomon coding, BCH coding and digital fountain coding, that is, the bits at the same index positions in the multiple CB sets are determined as information bit sequences, the information bit sequences are coded to generate check bit sequences in the abovementioned manner, and bits with the same position indexes in the multiple check bit sequences are concatenated to form the check CB sets. Bit-level coding may further adopt a network coding manner, that is, linear or nonlinear network coding is performed on the bits at the same index positions in the multiple CB sets to generate coded bit sequences, and the bits with the same position indexes in the multiple coded bit sequences are concatenated to form the check CB sets.

Symbol-level packet coding refers to that digital baseband modulation may be performed on a bit sequence of each CB set in the multiple CB sets to obtain a corresponding modulated symbol sequence, and the modulated symbols at multiple same index positions of the M CB sets are coded to obtain symbols at corresponding index positions of multiple check CB sets in the S check CB sets. For example, an ith modulated symbol of each CB set in the M CB sets is coded to obtain an ith symbol of each check CB set in the S check CB sets.

Symbol-level packet coding may adopt a symbol superimposition coding manner, that is, symbols at the same index positions in multiple CB sets are linearly superimposed to generate check symbol sequences, and the symbols at the same index positions in the check symbol sequences are concatenated to form the check CB sets. Symbol-level coding may also adopt the network coding manner, that is, the linear or nonlinear network coding is performed on the symbols at the same index positions in the multiple CB sets to generate check symbol sequences, and the symbols with the same position indexes in the multiple check symbol sequences are concatenated to form the check CB sets.

If the first transmission node sends m retransmission data signals to the second transmission node, data signal(s) for retransmission generated at least one time in the m retransmission data signals generated by the retransmission data generation module includes the Q bits in the check CB sets, where m is a positive integer. A manner may be, but not limited to, any one of the following manners:

only data signal(s) for retransmission generated in the first time include the Q bits in the check CB sets;

or, the first G1 generated retransmission data signals include the Q bits in the check CB sets, and the generated retransmission data signals from (G1+1)th retransmission do not include any bit in the check CB sets, where G1 is a fourth preset threshold value, G1 is a positive integer and 1≤G1≤D, where D is a system allowed maximum number of retransmission times;

or, the first G2 generated retransmission data signals do not include any bit in the check CB sets, and the generated retransmission data signals from (G2+1)th retransmission include the Q bits in the check CB sets, where G2 is a fifth preset threshold value, G2 is a positive integer and 1≤G2≤D, where D is the system allowed maximum number of retransmission times;

or, only odd generated retransmission data signals include the Q bits in the check CB sets;

or, only even generated data signal(s) for retransmission include the Q bits in the check CB sets;

or, if the first or second transmission node semi-statically or dynamically configures a packet coding retransmission mode, the data signal(s) for retransmission sent to the second transmission node by the first transmission node includes the Q bits in the check CB sets, or, the data signal(s) for retransmission does not include any bit in the check CB sets.

In certain embodiments, formation of the data signal(s) for retransmission includes, but not limited to, the following manners:

a first manner: the data signal(s) for retransmission only includes the Q bits in the S check CB sets; and a second manner: the data signal(s) for retransmission not only include the Q bits in the S check CB sets, but also include D bits in the P CB sets, where D is a positive integer, 1≤D≤Z, where Z is a length of the P CB sets.

Example One

In the present example, an evolved Node B includes a sending module, a packet coding module and a retransmission data generation module.

The sending module is configured to send TB signal(s) including 8 CBs for first transmission to a terminal node, wherein a TB is formed by P=2 CB sets, and the CB set 1 and the CB set 2 include 4 CBs respectively, as shown in FIG. 5.

The packet coding module is configured to perform packet coding on the two CB sets. At this moment, M=P=2, it is supposed that lengths of bit sequences of both the CB set 1 and the CB set 2 are N' bits, packet coding adopts a bit exclusive or (or called as modular two addition) coding manner, that is, an exclusive or (or called as modular two addition) operation is performed between bits at the same index positions in multiple CB sets.

As shown in FIG. 6, the exclusive or (or called as modular two additions) operation is performed between the bits at the same index positions in the CB set 1 and the CB set 2:

$c_1^1 \oplus c_1^1 = c_A^1, c_1^2 \oplus c_1^2 = c_A^2, \ldots, c_1^{N'} \oplus c_1^{N'} = c_A^{N'}$.

The generated check bits are concatenated to form data $\{c_A^1, c_A^2, \ldots, c_A^{N'}\}$ obtained by packet coding. The data obtained by packet coding also forms a CB set, and a length thereof is N' bits.

Each CB set is formed by multiple CBs, so that packet coding between the CB sets may also be considered as packet coding between the CBs. Therefore, packet coding shown in FIG. 6 may also be represented as a form shown in FIG. 7, wherein CB1', CB2', CB3' and CB4' are CBs in a check CB set A obtained by packet coding.

The retransmission data generation module: the evolved Node B (or the relay) sends data signal(s) for retransmission to the terminal, wherein a packet coding retransmission mode is semi-statically configured in high-layer signal(s)ing of the evolved Node B, and at this moment, the data signal(s) for retransmission may at least include part of bits of $\{c_A^1, c_A^2, \ldots, c_A^{N'}\}$ according to one of the following manners: the data signal(s) for retransmission only includes all or part of bits of $\{c_A^1, c_A^2, \ldots, c_A^{N'}\}$, or, the data signal(s) for retransmission further includes part or all bits in the CB set 1 or the CB set 2, besides all or part of the bits in $\{c_A^1, c_A^2, \ldots, c_A^{N'}\}$.

The sending module: the evolved Node B sends the data signal(s) for retransmission to the terminal through the sending module.

After receiving the data signal(s) for retransmission sent by the evolved Node B (or the relay), the terminal decodes the TB by virtue of retransmission data and data received during first transmission, and a decoding method may be, but not limited to, one of the following manners:

hard decision decoding: after hard decision is performed on the data during first transmission and the retransmission data, CBs which are incorrectly decoded during first transmission are recovered by virtue of a characteristic of a linear code; or, soft decision decoding: soft decision information during first transmission and retransmission soft decision information are combined or iteratively decoded to recover the CBs which are incorrectly decoded during first transmission.

Example Two

In the present example, an evolved Node B is a first transmission node, and a terminal is a second transmission node.

The evolved Node B includes a sending module, a CB set division module, a packet coding module and a retransmission data generation module.

The sending module of the evolved Node B sends TB signal(s) including 39 CBs to the terminal, wherein each CB has a CB CRC, and each TB also has a TB CRC.

If the TB CRC or the CB CRCs fail in CRC on a terminal side, that is, the evolved Node B (or the relay) does not correctly receive the TB, the terminal feeds back incorrectness indication information (NACK) about the TB to the evolved Node B.

The CB set division module of the evolved Node B divides the K=39 CBs of the TB into P=10 CB sets: a CB set 1, a CB set 2, . . . , and a CB set 10. Because K may not be exactly divided by P, each CB set in $P_1=K-P\cdot\lfloor K/P \rfloor$ CB sets includes $\lceil K/P \rceil$ CBs, and each CB set in $P_2=P\cdot\lceil K/P \rceil-K$ CB sets includes $\lfloor K/P \rfloor$ original CBs and a filling CB. That is, each CB set from the CB set 1 to the CB set 9 includes 4 original CBs; the CB set 10 includes 3 original CBs and a filling CB, as shown in FIG. 8.

The CB CB40 represents the filling CB, and the filling CB CB40 may be formed by any preset bit sequence, including, but not limited to, one of the following manners:

a first manner: a CB formed by an all-1 bit sequence or an all-0 bit sequence; and a second manner: any CB in the K original CBs of the TB.

The packet coding module of the evolved Node B performs packet coding on 7 CB sets in the 10 CB sets. At this moment, M=7. It is supposed that packet coding is performed from the CB set 1 to the CB set 7, packet coding adopts a bit-level coding manner, and as shown in FIG. 9, S=3 check CB sequences are generated, i.e. a check CB set A1, a check CB set A2 and a check CB set A3 respectively.

The retransmission data generation module of the evolved Node B is configured to generate data signal(s) for retransmission sent to the terminal, wherein the data signal(s) for retransmission at least includes part of bits in the check CB sets according to one of the following manners: the data signal(s) for retransmission only includes all or part of bits in the check CB set A1, the check CB set A2 or the check CB set A3; or, the data signal(s) for retransmission further includes part or all bits in the CB set 1 to the CB set 7, besides all or part of the bits in the check CB sets.

The sending module of the evolved Node B is configured to send the data signal(s) for retransmission to the terminal.

After receiving the data signal(s) for retransmission sent by the evolved Node B (or the relay), the terminal decodes the TB by virtue of retransmission data and data received during first transmission, and a decoding method may be, but not limited to, one of the following manners:

hard decision decoding: after hard decision is performed on the data during first transmission and the retransmission data, CBs which are incorrectly decoded during first transmission are recovered by virtue of a characteristic of a linear code; or, soft decision decoding: soft decision information during first transmission and retransmission soft decision information are combined or iteratively decoded to recover the CBs which are incorrectly decoded during first transmission.

Those skilled in the art should know that all or part of the steps of the embodiment may be implemented by virtue of a flow of a computer program, the computer program may be stored in a computer-readable storage medium, the computer program is executed on a corresponding hardware platform (such as a system, equipment, a device and an apparatus), and during execution, one of combination of the steps of the method embodiment is included.

In certain embodiments, all or part of the steps of the embodiment may also be implemented by an integrated circuit. These steps may be formed into multiple integrated circuit modules respectively, or multiple modules or steps therein form a single integrated circuit module for implementation.

Each device/function module/function unit in the embodiment may be implemented by adopting a universal computing device, and they may be concentrated on a single computing device, and may also be distributed on a network formed by multiple computing devices.

When being implemented in form of software function module and sold or used as an independent product, each device/function module/function unit in the embodiment may be stored in a computer-readable storage medium. The abovementioned computer-readable storage medium may be a read-only memory, a magnetic disk, an optical disk or the like.

INDUSTRIAL APPLICABILITY

The embodiments of the present disclosure enhance retransmission performance. The retransmission data of the embodiments of the present disclosure includes the data obtained by packet coding of the CB sets, and packet coding refers to addition of a layer of coding between the CBs, so that the multiple CBs are not mutually independent but mutually associated. If a CB gets incorrect, it may be corrected by virtue of additional information provided by another CB during decoding. Therefore, the retransmission performance is improved. The embodiments of the present disclosure effectively reduce a retransmission data volume under the condition of not increasing an amount of feedback information, and improve the retransmission performance.

What is claimed is:

1. A data transmission method, comprising:
   sending, by a first transmission node, data signal(s) for first transmission to a second transmission node, wherein the data signal(s) for first transmission comprise data of at least one Transmission Block (TB), the TB comprises K Code Blocks (CBs), and the K CBs are divided into P CB sets, where K and P are positive integers, $K \geq 3$ and $2 \leq P \leq K$;
   performing, by the first transmission node, packet coding on M CB sets in the P CB sets to obtain S check CB sets, where lengths of the check CB sets are T bits, M, S and T are positive integers and $2 \leq M \leq P$; and
   generating, by the first transmission node, data signal(s) for retransmission and sending the data signal(s) for retransmission to the second transmission node, the data signal(s) for retransmission at least comprising Q bits in the check CB sets when a preset condition is met, where Q is a positive integer and $1 \leq Q \leq T$.

2. The method according to claim 1, wherein a number of CBs in each CB set is determined as follows:
   when K can be exactly divided by P, each CB set comprises K/P CBs; and
   when K cannot be exactly divided by P, each CB set in $P_1=K-P\cdot\lfloor K/P \rfloor$ CB sets comprises $\lceil K/P \rceil$ CBs, and each CB set in $P_2=P\cdot\lceil K/P \rceil-K$ CB sets comprises $\lfloor K/P \rfloor$ original CBs and a filling CB, where operators $\lceil x \rceil$ and $\lfloor x \rfloor$ respectively represent a rounding-up and rounding-down operations over x, and $P_1+P_2=P$.

3. The method according to claim 2, wherein the filling CB is formed by any preset data, comprising a CB formed by an all-1 bit sequence or an all-0 bit sequence, or any CB in the CB set, or any CB in the K CBs in the TB.

4. The method according to claim 1, further comprising:
performing, by the first transmission node, CB concatenation on the CBs in each CB set, wherein CB concatenation refers to that bit sequences of all the CBs in the CB set are connected in series.

5. The method according to claim 1, where the K CBs in the CB sets are CBs subjected to channel coding and rate matching; and
the K CBs in the CB sets and the K CBs in the TB are generated by the same information bit sequences through a channel coder.

6. The method according to claim 1, wherein packet coding of the M CB sets in the P CB sets refers to that the M CB sets are selected from the P CB sets for packet coding, wherein a selection method is one of the following methods:
M continuous CB sets are selected from the P CB sets; or, M equally spaced CB sets are selected from the P CB sets; or, the M CB sets are randomly selected from the P CB sets; or, M CB sets comprising incorrect CBs of which numbers are not smaller than a first preset threshold value are selected from the P CB sets; or, M CB sets comprising incorrect CBs of which numbers are not more than a second preset threshold value are selected from the P CB sets; or, M CB sets comprising incorrect CBs, of which numbers do not exceed a third preset threshold value, at the same index positions are selected from the P CB sets.

7. The method according to claim 1, wherein the packet coding refers to that:
bits or symbols at the same index positions in the M CB sets are coded to generate the S check CB sets; or,
cyclic shift or interleaving is performed on CBs, bits or symbols of the M CB sets respectively, and then the bits or symbols at the same index positions are coded to generate the S check CB sets.

8. The method according to claim 7, wherein, when lengths of the M CB sets are different, filling bits are added into the other CB sets by taking the length of the longest CB set as a reference, the lengths of all the M CB sets being the same after filling, wherein the filling bits are formed by any preset bit sequences, comprising all-1 bit sequences or all-0 bit sequences, or part of bits in any CB in the CB sets.

9. The method according to claim 1, wherein that the data signal(s) for retransmission at least comprises the Q bits in the check CB sets refers to that:
data signal(s) for at least one retransmission in data signals for m retransmission comprises the Q bits in the check CB sets, where m is a positive integer; and
the data signal(s) for at least one retransmission comprises the Q bits in the check CB sets according to any one of the following manners:
only data signal(s) for the first retransmission comprises the Q bits in the check CB sets;
or, the first G1 data signal(s) for retransmission comprise the Q bits in the check CB sets, and the data signal(s) for retransmission from (G1+1)th retransmission do not comprise any bit in the check CB sets, where G1 is a fourth preset threshold value, G1 is a positive integer and $1 \leq G1 \leq D$, where D is a system allowed maximum number of retransmission times;
or, the first G2 data signal(s) for retransmission do not comprise any bit in the check CB sets, and the data signal(s) for retransmission from (G2+1)th retransmission comprise the Q bits in the check CB sets, where G2 is a fifth preset threshold value, G2 is a positive integer and $1 \leq G2 \leq D$, where D is the system allowed maximum number of retransmission times;
or, only odd data signal(s) for retransmission comprise the Q bits in the check CB sets;
or, only even data signal(s) for retransmission comprise the Q bits in the check CB sets.

10. The method according to claim 1, wherein the preset condition is that the first transmission node or the second transmission node semi-statically or dynamically configures a packet coding retransmission mode.

11. A data transmission device, arranged in a transmission node and comprises a hardware processor, comprising:
a sending module, configured to send data signal(s) for first transmission to a second transmission node, wherein the data signal(s) comprises data of at least one Transmission Block (TB), the TB comprises K Code Blocks (CBs), and the K CBs are divided into P CB sets, where K and P are positive integers, $K \geq 3$ and $2 \leq P \leq K$;
a packet coding module, configured to perform packet coding on M CB sets in the P CB sets to obtain S check CB sets, wherein lengths of the check CB sets are T bits, M, S and T are all positive integers and $2 \leq M \leq P$; and
a retransmission data generation module, configured to generate data signal(s) for retransmission and send the data signal(s) for retransmission to the second transmission node through the sending module, the data signal(s) for retransmission at least comprising Q bits in the check CB sets when a preset condition is met, where Q is a positive integer and $1 \leq Q \leq T$.

12. The device according to claim 11, further comprising:
a CB set division module, configured to divide the K CBs into the P CB sets, a number of CBs in each CB set being determined as follows:
when K can be exactly divided by P, each CB set comprises K/P CBs; and
when K cannot be exactly divided by P, each CB set in $P_1 = K - P \cdot \lfloor K/P \rfloor$ CB sets comprises $\lceil K/P \rceil$ CBs, and each CB set in $P_2 = P \cdot \lceil K/P \rceil - K$ CB sets comprises $\lfloor K/P \rfloor$ original CBs and a filling CB, where operators $\lceil x \rceil$ and $\lfloor x \rfloor$ respectively represent a rounding-up and rounding-down operations over x respectively, and $P_1 + P_2 = P$.

13. The device according to claim 11, wherein the filling CB is formed by any preset data, comprising a CB formed by an all-1 bit sequence or an all-0 bit sequence, or any CB in the CB set, or any CB in the K CBs in the TB.

14. The device according to claim 11, further comprising:
a concatenation module, configured to perform CB concatenation on the CBs in each CB set, wherein CB concatenation refers to that bit sequences of all the CBs in the CB set are connected in series.

15. The device according to claim 11, wherein
the K CBs in the CB sets are CBs subjected to channel coding and rate matching; and
the K CBs in the CB sets and the K CBs in the TB are generated by the same information bit sequences through a channel coder.

16. The device according to claim 11, wherein the operation that the packet coding module performs packet coding on the M CB sets in the P CB sets refers to that the M CB sets are selected from the P CB sets for packet coding, wherein a selection method is one of the following methods:
M continuous CB sets are selected from the P CB sets; or, M equally spaced CB sets are selected from the P CB sets; or, the M CB sets are randomly selected from the P CB sets; or, M CB sets comprising incorrect CBs of which numbers are not smaller than a first preset threshold value are selected from the P CB sets; or, M CB sets comprising incorrect CBs of which numbers are not more than a second preset threshold value are selected from the P CB sets; or, M CB sets comprising incorrect CBs, of which numbers do not exceed a third preset threshold value, at the same index positions are selected from the P CB sets.

17. The device according to claim 11, wherein the operation that the packet coding module performs packet coding refers to that:
the packet coding module codes bits or symbols at the same index positions in the M CB sets to generate the S check CB sets; or,
the packet coding module performs cyclic shift or interleaving on CBs, bits or symbols of the M CB sets respectively, and then codes the bits or symbols at the same index positions to generate the S check CB sets.

18. The device according to claim 17, wherein the packet coding module is further configured to, when lengths of the M CB sets are different, add filling bits into the other CB sets by taking the length of the longest CB set as a reference, the lengths of all the M CB sets being the same after filling, wherein the filling bits are formed by any preset bit sequences, comprising all-1 bit sequences or all-0 bit sequences, or part of bits in any CB in the CB sets.

19. The device according to claim 11, wherein that the data signal(s) for retransmission at least comprises the Q bits in the check CB sets refers to that:
data signal(s) for retransmission generated at least one time in data signals for retransmission generated m times by the retransmission data generation module comprises the Q bits in the check CB sets, where m is a positive integer,
wherein the data signal(s) for retransmission generated at least one time comprises the Q bits in the check CB sets according to any one of the following manners:
only data signal(s) for retransmission generated in the first time comprises the Q bits in the check CB sets;
or, the first G1 generated data signal(s) for retransmission comprise the Q bits in the check CB sets, and the generated data signal(s) for retransmission from (G1+1)th retransmission do not comprise any bit in the check CB sets, where G1 is a fourth preset threshold value, G1 is a positive integer and $1 \leq G1 \leq D$, where D is a system allowed maximum number of retransmission times;
or, the first G2 generated data signal(s) for retransmission do not comprise any bit in the check CB sets, and the generated data signal(s) for retransmission from (G2+1)th retransmission comprise the Q bits in the check CB sets, where G2 is a fifth preset threshold value, G2 is a positive integer and $1 \leq G2 \leq D$, where D is the system allowed maximum number of retransmission times;
or, only odd generated data signal(s) for retransmission comprise the Q bits in the check CB sets;
or, only even generated data signal(s) for retransmission comprise the Q bits in the check CB sets.

20. The device according to claim 11, wherein the preset condition is that the first or second transmission node semi-statically or dynamically configures a packet coding retransmission mode.

* * * * *